US011335020B2

(12) United States Patent
Liu et al.

(10) Patent No.: US 11,335,020 B2
(45) Date of Patent: May 17, 2022

(54) METHOD AND SYSTEM FOR CORRECTING TEMPERATURE ERROR OF DEPTH CAMERA

(71) Applicant: ORBBEC INC., Guangdong (CN)

(72) Inventors: Xianzhuo Liu, Guangdong (CN); Zhiming Huang, Guangdong (CN); Xu Chen, Guangdong (CN)

(73) Assignee: Orbbec Inc., Shenzhen (CN)

( * ) Notice: Subject to any disclaimer, the term of this patent is extended or adjusted under 35 U.S.C. 154(b) by 122 days.

(21) Appl. No.: 16/847,907

(22) Filed: Apr. 14, 2020

(65) Prior Publication Data

US 2020/0242792 A1 Jul. 30, 2020

Related U.S. Application Data

(63) Continuation of application No. PCT/CN2018/071990, filed on Jan. 9, 2018.

(30) Foreign Application Priority Data

Oct. 17, 2017 (CN) .......................... 201710966717.5

(51) Int. Cl.
*G06T 7/593* (2017.01)
(52) U.S. Cl.
CPC .... *G06T 7/593* (2017.01); *G06T 2207/10028* (2013.01)
(58) Field of Classification Search
CPC .............. G06T 7/593; G06T 2207/10028
See application file for complete search history.

(56) References Cited

U.S. PATENT DOCUMENTS

| 8,570,320 | B2 | 10/2013 | Izadi et al. |
| 8,866,889 | B2 | 10/2014 | Masalkar et al. |
| 9,204,133 | B2 * | 12/2015 | Shigemura ........... H04N 13/398 |
| 9,210,417 | B2 | 12/2015 | Hall |
| 9,330,324 | B2 * | 5/2016 | Cohen .................. H04N 13/254 |
| 9,681,043 | B2 | 6/2017 | Chen et al. |

(Continued)

FOREIGN PATENT DOCUMENTS

| CN | 102436657 A | 5/2012 |
| CN | 102572505 A | 7/2012 |

(Continued)

OTHER PUBLICATIONS

PCT International Search Report and the Written Opinion dated May 30, 2018, issued in related International Application No. PCT/CN2018/071990, with partial English translation (12 pages).

(Continued)

*Primary Examiner* — Gregory M Desire
(74) *Attorney, Agent, or Firm* — Sheppard Mullin Richter & Hampton LLP

(57) ABSTRACT

A method for correcting errors of a depth camera caused by the temperature includes: obtaining, by at least two depth cameras, a depth image of a current target, wherein two adjacent depth cameras of the at least two depth cameras have a common field of view; modeling a measurement error of the two adjacent depth cameras caused by a temperature change; and correcting the depth image using the modeled measurement error, wherein the corrected depth image has a minimum depth difference in the common field of view.

17 Claims, 4 Drawing Sheets

(56) References Cited

U.S. PATENT DOCUMENTS

| | | | |
|---|---|---|---|
| 9,729,362 B1 | 8/2017 | Ralph et al. | |
| 9,858,684 B2* | 1/2018 | Kim | H04N 13/254 |
| 10,390,002 B2* | 8/2019 | Zabatani | G06T 5/006 |
| 10,645,795 B2* | 5/2020 | Byrne | H04N 5/22521 |
| 2014/0340771 A1 | 11/2014 | Wakabayashi et al. | |
| 2015/0022669 A1* | 1/2015 | Hall | H04N 13/246 348/187 |
| 2015/0350618 A1 | 12/2015 | Meier et al. | |
| 2016/0104285 A1 | 4/2016 | Pettegrew et al. | |
| 2017/0276605 A1 | 9/2017 | Barich et al. | |
| 2020/0242792 A1* | 7/2020 | Liu | G01B 11/245 |

FOREIGN PATENT DOCUMENTS

| | | |
|---|---|---|
| CN | 102681661 A | 9/2012 |
| CN | 104937401 A | 9/2015 |
| CN | 105027562 A | 11/2015 |
| CN | 105323454 A | 2/2016 |
| CN | 105432079 A | 3/2016 |
| CN | 107133984 A | 9/2017 |

OTHER PUBLICATIONS

Xu Jing et al., "Stereo Correction of Binocular Images with Optical Axes Divergent Arrangement", Journal of Shanghai Jiaotong University, Feb. 28, 2015, pp. 141-149.

PCT International Preliminary Report on Patentability dated Apr. 30, 2020, issued in related International Application No. PCT/CN2018/071990, with English translation (12 pages).

First Search dated Aug. 12, 2020, issued in related Chinese Application No. 201710966717.5 (2 pages).

First Office Action dated Aug. 18, 2020, issued in related Chinese Application No. 201710966717.5, with English machine translation (13 pages).

Supplemental Search dated Nov. 12, 2020, issued in related Chinese Application No. 201710966717.5 (1 page).

* cited by examiner

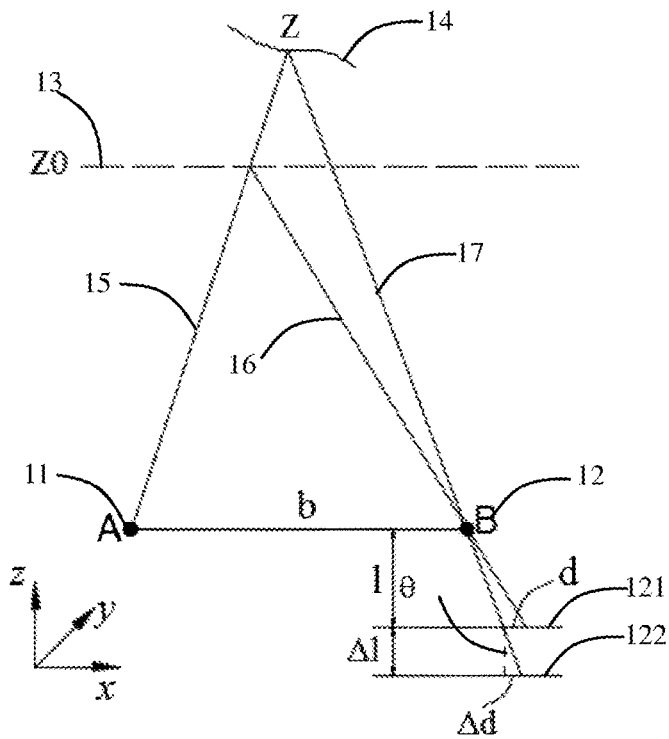

FIG. 1

A measured deviation value of a speckle image of a current target with respect to a reference speckle image is obtained using a depth computation processor in a depth camera.

The measurement error of the depth camera caused by the temperature change is modeled.

A measured deviation value is corrected using the modeled measurement error, and a depth image according to the corrected deviation value is calculated.

FIG. 2

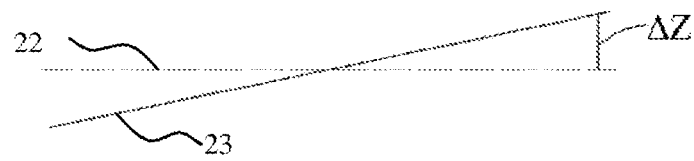
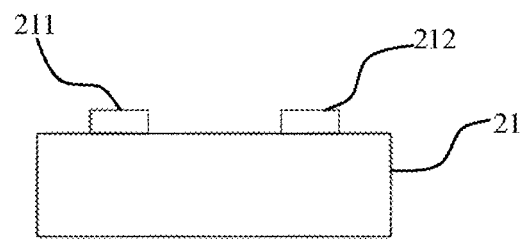
FIG. 3
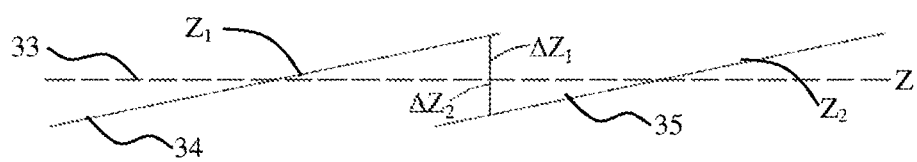
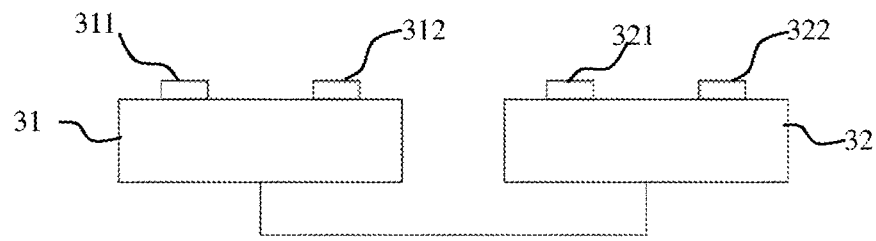
FIG. 4

METHOD AND SYSTEM FOR CORRECTING TEMPERATURE ERROR OF DEPTH CAMERA

CROSS-REFERENCE TO RELATED APPLICATION

This is a continuation of International Patent Application No. PCT/CN2018/071990, filed on Jan. 9, 2018, and entitled "METHOD AND SYSTEM FOR CORRECTING TEMPERATURE ERROR OF DEPTH CAMERA", which is based on and claims priority to and benefit of Chinese Patent Application No. 201710966717.5, filed with China National Intellectual Property Administration (CNIPA) of People's Republic of China on Oct. 17, 2017. The entire disclosures of all of the above-identified applications are incorporated herein by reference.

TECHNICAL FIELD

The present application relates to the field of optical and electronic technologies, and in particular, to a method and system for correcting an error of a depth camera caused by temperature variations.

BACKGROUND

In some depth image-based applications such as 3D modeling and size measurement, a depth camera is required to obtain a depth image with high precision and accuracy. However, since the depth camera includes a laser light source, an optical element, an image sensor, and the like, it is inevitably susceptible to both the temperature of the depth camera and the ambient temperature. The temperature may cause the performance of the optical elements to become unstable, and the body of the depth camera to deform. Quality of depth images may be reduced due to all these factors, resulting in reduction of the precision and accuracy of the depth camera.

SUMMARY

To resolve the problems in the existing technologies that the precision and accuracy of a depth camera are reduced due to the temperature, the present application provides a method and system for correcting an error of a depth camera caused by temperature variations.

To resolve the foregoing problems, technical solutions adopted by the present application may be provided as follows.

The present application provides a method for correcting errors of a depth camera caused by temperature variations. The method may comprise: obtaining, by at least two depth cameras, a depth image of a current target, wherein two adjacent depth cameras of the at least two depth cameras have a common field of view; modeling a measurement error of the two adjacent depth cameras caused by a temperature change; and correcting the depth image using the modeled measurement error, wherein the corrected depth image has a minimum depth difference in the common field of view.

The method for correcting errors of a depth camera caused by temperature variations may further comprise: determining a gap change $\Delta l$ caused by the temperature change in a gap $l$ between a lens and an image sensor of an acquisition module in each of the two adjacent depth cameras; and determining, according to the gap change $\Delta l$, an error $\Delta d$ between a measured deviation value $d'$ and a true deviation value $d$, wherein $\Delta d = \Delta l \cdot \tan\theta$, and $\theta$ is an angle between an optical axis of the lens and a connecting line between the current target and an optical center of the lens.

The method for correcting errors of a depth camera caused by temperature variations may further comprise: determining, according to the error $\Delta d$, a depth difference $\Delta Z$ between depth values in the common field of view of the two adjacent depth cameras, wherein $$\Delta Z = -Z_1^2 \frac{\Delta l_1 \tan\theta_1}{lb} + Z_2^2 \frac{\Delta l_2 \tan\theta_2}{lb},$$

wherein $Z_1$ and $Z_2$ are respective depth values of the two adjacent depth cameras, $\Delta l_1$ and $\Delta l_2$ are respective gap changes between lenses and image sensors of acquisition modules in the two adjacent depth cameras, $\theta_1$ and $\theta_2$ are respective angles between optical axis of the lenses and connecting lines between the current target and optical centers of the lenses of the two adjacent depth cameras, and b is a length of a baseline connecting a projection module and an acquisition module of one of the two adjacent depth cameras.

The method for correcting errors of a depth camera caused by temperature variations may further comprise: calculating depth differences $\Delta Z^{(i)} = Z_1^{(i)} - Z_2^{(i)}$ between depth values of each pixel in different depth images of the common field of view, wherein $i \in [1, m]$, m is a quantity of a portion of pixels in the common field of view, the depth difference $\Delta Z^{(i)}$ is determined by errors of the two adjacent depth cameras, and the errors of the two adjacent depth cameras are the same such that $\Delta Z_1^{(i)} = -\Delta Z_2^{(i)} = \Delta Z^{(i)}/2$; calculating gap changes $\Delta l_1^{(i)}$ and $\Delta l_2^{(i)}$ according to the depth difference $\Delta Z_1^{(i)}$, $\Delta Z_2^{(i)}$, and a formula $$\Delta Z_1^{(i)} = -Z^2 \frac{\Delta l \tan\theta}{lb},$$

and averaging the gap changes $\Delta l_1^{(i)}$ and $\Delta l_2^{(i)}$ corresponding to the m pixels to obtain the gap changes $\Delta l_1$ and $\Delta l_2$; and correcting depth values of pixels of the two adjacent depth cameras using the gap changes $\Delta l_1$ and $\Delta l_2$ in combination with the depth difference $$\Delta Z = -Z^2 \frac{\Delta l \tan\theta}{lb}.$$

The method for correcting errors of a depth camera caused by temperature variations may further comprise correcting the depth image using a least square method.

The method for correcting errors of a depth camera caused by temperature variations may further comprise calculating the gap changes $\Delta l_1$ and $\Delta l_2$ of the two adjacent depth cameras by minimizing a cost function $J = k\Sigma_{i=1}^{m}(Z_1^{(i)} - Z_2^{(i)} - \Delta Z^{(i)})^2$, and correcting the depth image of the at least two depth cameras according to the gap changes $\Delta l_1$ and $\Delta l_2$, wherein k is a coefficient.

The method for correcting errors of a depth camera caused by temperature variations may further comprise calculating the gap changes $\Delta l_1$ and $\Delta l_2$ by at least one of gradient descent, Newton's method, and a normal equation.

The present application further provides a system for correcting errors of a depth camera caused by temperature variations. The system may comprise at least two depth cameras, configured to obtain a depth image of a current target, wherein two adjacent depth cameras of the at least two depth cameras have a common field of view; and a processor, configured to execute computer instructions stored in a memory to perform operations. The operations may include: modeling a measurement error of the two adjacent depth cameras caused by a temperature change; and correcting the depth image using the modeled measurement error, wherein the corrected depth image has a minimum depth difference in the common field of view.

The present application further provides a non-transitory computer-readable storage medium storing computer instructions executable by at least one processor to cause the at least one processor to perform operations. The operations may include: obtaining, by at least two depth cameras, a depth image of a current target, wherein two adjacent depth cameras of the at least two depth cameras have a common field of view; modeling a measurement error of the two adjacent depth cameras caused by a temperature change; and correcting the depth image using the modeled measurement error, wherein the corrected depth image has a minimum depth difference in the common field of view.

Benefits of the present application may include providing a method and system for correcting an error of a depth camera. The present application provides a method and system for correcting an error of a depth camera. Based on a principle that depth values of a common field of view of a plurality of depth cameras should be the same, a relationship model between a temperature change and a depth measurement error is established, and a plurality of solution methods are used to solve and correct a depth measurement error, so that the measurement precision of a depth camera can be improved.

BRIEF DESCRIPTION OF THE DRAWINGS

FIG. 1 is a schematic diagram illustrating an imaging principle and error formation of a depth camera, according to an embodiment of the present application.

FIG. 2 is a flow chart of a method for correcting errors of a depth camera caused by temperature variations, according to an embodiment of the present application.

FIG. 3 is a schematic diagram for correcting errors of a depth camera caused by temperature variations, according to an embodiment of the present application.

FIG. 4 is a schematic diagram for correcting errors of two adjacent depth cameras caused by temperature variations, according to an embodiment of the present application.

Figure 5:
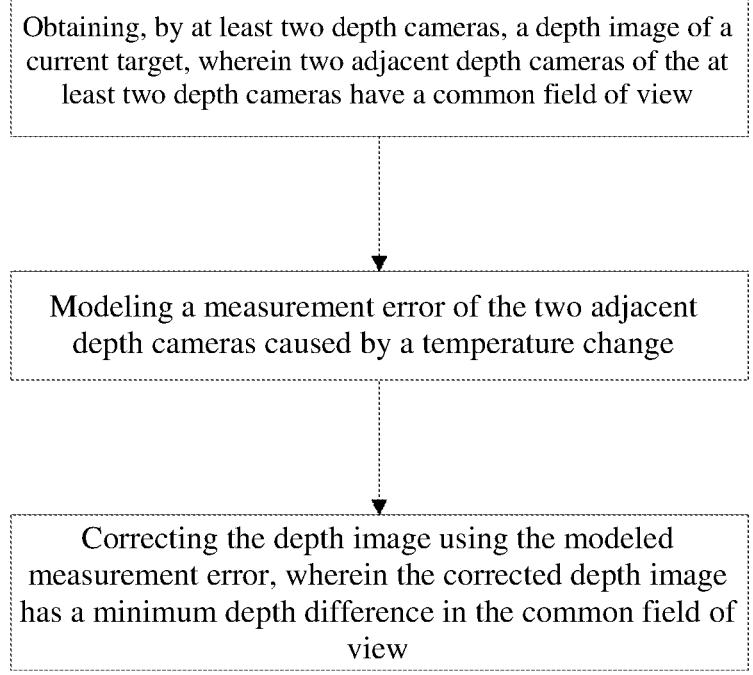
FIG. 5 is a flow chart of a method for correcting errors of depth cameras caused by temperature variations, according to another embodiment of the present application.

The labels in the drawings are indicated as follows:
11—projection module,
12—acquisition module,
13—plane,
14—target object,
15—light beam,
16—acquisition light,
17—light,
121—plane of an image sensor,
122—plane of a deviated position of an image sensor,
21—depth camera,
22—true plane,
23—measured plane,
211—projection module,
212—acquisition module,
31—depth camera,
32—depth camera,
33—target,
34—obtained depth image, and
35—obtained depth image.

DETAILED DESCRIPTION OF EMBODIMENTS

To clearly describe the technical problems, technical solutions, and benefits of the embodiments of the present application, the present application is described in detail below with reference to the accompanying drawings and embodiments. It should be understood that the embodiments herein are provided for describing the present application and not for limiting the present application.

It is to be noted that, when an element is "fixed on" or "arranged on" another element, the element can be disposed on the another element directly or indirectly. When an element is "connected to" another element, the element can be connected to the another element directly or indirectly. In addition, the connection can include physical fixation or electrical communication.

In the description of this application, a direction or location relationship indicated by a term "length," "width," "on," "under," "front," "rear," "left," "right," "vertical," "horizontal," "top," "bottom," "inner," "outer," or the like is a direction or location relationship shown based on the accompanying drawings, and is intended only to conveniently describe the embodiments of the present application and simplify the description, but does not indicate or imply that a mentioned apparatus or element needs to have a particular direction and is constructed and operated in the particular direction. Therefore, the direction or location relationship should not be understood as a limitation on the present application.

In addition, terms "first" and "second" are only used to describe the objective and should not be understood as indicating or implying relative importance or implying a quantity of the indicated technical features. In view of this, a feature defined to be "first" or "second" may explicitly or implicitly include one or more features. In the descriptions of the embodiments of the present application, "a plurality of" means two or more, unless otherwise definitely and specifically limited.

In a depth image obtained by a depth camera, the value of each pixel represents a distance between a corresponding space point and the depth camera, and quality of the depth image includes precision and accuracy. The precision refers to a difference between a plurality of obtained depth images when the relative position of the depth camera and a target is fixed. A smaller difference indicates a higher precision, or a higher measurement consistency and a higher stability of the depth camera. The accuracy refers to a difference between a measured value and a true value, and a smaller difference indicates a higher accuracy. The measured value is a value displayed on the depth image. The true value is a value representing a true distance between the target and the depth camera.

During measurement with a single depth camera, the temperature may gradually increase after the depth camera is turned on. The precision and accuracy, especially the precision, of the obtained depth images may become low and the obtained depth images are not very stable until the temperature is stabilized. Therefore, the depth images of the depth camera are usually extracted for further application after the temperature becomes stable. However, the accuracy is usually determined by a system error, so that the obtained depth images may deviate from the true value. For a structured light depth camera, the obtained depth images may deviate from the true value and deflect due to the temperature and other factors.

In some applications, multiple depth cameras are needed to obtain a depth image with a larger field of view. Each depth camera obtains a depth image separately. A plurality of depth images are then spliced and fused. When the depth image obtained by the depth camera has low accuracy, an error occurs in splicing. For example, when two depth cameras obtain depth images of different areas in a plane at the same time (usually, areas of the depth images are partially overlapped), the fused depth image may be in a nonplanar form, for example, a curved surface or a sectional surface.

Therefore, correcting an error of the depth camera caused by the temperature helps improve the precision and accuracy of the depth camera. A structured light depth camera is described below with reference to FIG. 1 to FIG. 3, to provide a method and system for correcting errors caused by the temperature.

Measurement Principles of the Structured Light Depth Camera

FIG. 1 is a schematic diagram for illustrating an imaging principle of a depth camera, according to an embodiment of the present application. The structured light depth camera generally includes a projection module 11, an acquisition module 12, and a depth computation processor (not shown in the figure). In an embodiment, the projection module 11 is a near-infrared speckle projector, and is used to project a near-infrared speckle pattern into a target space. When projecting onto a plane, a formed speckle image has characteristics of randomness and non-correlation. The acquisition module 12 is a near-infrared camera, and is used to acquire speckle images. The acquired speckle images are then transmitted to the depth computation processor. Depth computation is then performed on the acquired speckle image to output a depth image. A single speckle is used as an example in FIG. 1. The projection module 11 projects a light beam 15. The light beam 15 is projected to a point Z of a target object 14. The point Z is imaged on an image sensor at a plane 121 through a lens B of the acquisition module 12. Light 17 is used for representing an imaging relationship with respect to the point Z.

The depth camera generally further includes a memory, storing a reference speckle image. The reference speckle image is acquired by the acquisition module 12 after the projection module 11 projects a speckle image on a plane 13 at a known distance $Z_0$. Acquisition light 16 is used for representing an imaging relationship with respect to the plane 13. The speckle on the plane 13 is imaged at the image sensor at the plane 121 through the lens. It can be seen from the FIG. 1 that, the target object 14 and the reference plane 13 are not located at a same depth, so that the position of a same speckle imaged on the image sensor is changed accordingly. During the calculation, the depth computation processor matches the speckle image of the current target with the reference speckle image, calculates a deviation value d between a speckle (a pixel) in the current speckle image and a corresponding speckle (pixel) in the reference speckle image, and calculates a depth value of the target according to the following formulas. The depth values of the pixels eventually form a depth image.

$$Z = \frac{lbZ_0}{lb - Z_0 d} \quad (1)$$

Z is a depth value of the target. $Z_0$ is a depth value of the plane 13. d is a distance between the lens and the image sensor of the acquisition module 12, and is generally equal to the focal length of the lens. The lens herein may be a lens group, and b is the length of a baseline connecting the projection module 11 and the acquisition module 12.

Measurement Error Caused by a Temperature

High heat may be generated in a process of acquiring the speckle image by the acquisition module in the depth camera, resulting in a high temperature of the module, which will bring many effects. Temperature may cause a change to the performance of the lens in the acquisition module. For example, the focal length may be changed to reduce the contrast of the speckle image. The problem usually may be solved by using a lens made of glass, because glass is highly adaptable to temperature. In addition, temperature may cause a thermal deformation of the acquisition module. For example, the lens and the image sensor may deviate from their original positions, that is, the value l of the gap between the lens and the image sensor may be changed. In the embodiment shown in FIG. 1, the change of the gap l between the lens and the image sensor caused by the temperature change is Δl, the position B of the lens in this embodiment is unchanged, and only the image sensor changes from a position on the plane 121 to a position on a plane 122. It can be understood that this is simplified processing only for ease of description, and there may be other forms of change in other embodiments.

Generally, during the acquisition of the reference speckle image, the temperature of the acquisition module is $T_1$, and the gap between the lens and the image sensor is l. During measurement of the target object, the temperature of the acquisition module is $T_2$, and $T_2 \neq T_1$. That is, a point on the current target should be imaged at the position on the plane 121, and is eventually imaged at the position on the plane 122 due to the temperature change, referring to FIG. 1, specifically, an intersection of an extension line of the light 17 and the image sensor located on the plane 122. When performing matching calculations, there is a following relationship between a measured deviation value d' and a true deviation value d:

$$d' = d - \Delta d \quad (2)$$

The above Δd is a change in a deviation value caused by the position change of the image sensor. It can be known from FIG. 1 that, Δd=Δl·tan θ, where θ is an angle between an optical axis of the lens and a connecting line between the target and an optical center of the lens.

According to the foregoing analysis, the following two correction methods can be obtained.

In an internal correction method, a calculation expression of a true depth value can be obtained by substituting Formula (2) into Formula (1):

$$Z = \frac{lbZ_0}{lb - Z_0 d' - Z_0 \Delta l \cdot \tan \theta} \quad (3)$$

Formula (3) describes a relationship among the true depth value Z, the measured deviation value d', and the gap change Δl in a gap l due to the temperature influence. It can be known that, a more realistic depth value Z can be directly calculated by obtaining a distance change Δl caused by the temperature.

In an external correction method, a partial derivative calculation is performed on Formula (1) to obtain a relationship between the deviation value change Δd and the depth value change (that is, a difference between the true depth value and the measured value):

$$\Delta Z = \frac{\partial Z}{\partial a}\Delta d = -\frac{lb}{\left(\frac{lb}{Z_0}+d\right)^2}\Delta d = -Z^2\frac{\Delta d}{lb} = -Z^2\frac{\Delta l \tan\theta}{lb} \quad (4)$$

It can be known from Formula (4) that, a depth value change ΔZ can be calculated after the gap change Δl is obtained. The measured value can then be corrected according to the depth value change ΔZ.

Differences between the two correction methods are as follows. In the internal correction method, the temperature change and the true depth value are directly modeled, and the true depth image can be directly output by obtaining a temperature change value. However, in the external correction method, the temperature change and the depth value change are modeled, and a true depth value is calculated by obtaining the temperature change value and the measured depth value. The two correction methods are described below with reference to specific embodiments.

Temperature Correction Using the Internal Correction Method

As shown in FIG. 2, the measurement error of a depth camera caused by a temperature change can be corrected using the following methods and concept.

First, a measured deviation value of a speckle image of a current target with respect to a reference speckle image is obtained using a depth computation processor in a depth camera.

Second, the measurement error of the depth camera caused by the temperature change is modeled.

Eventually, a current measured deviation value is corrected using the modeled measurement error, and a depth image according to the corrected deviation value is calculated.

The following embodiments mainly describe modeling the measurement error caused by the temperature and correction of a depth image.

FIG. 3 is a schematic diagram for correcting errors of a depth camera caused by the temperature, according to an embodiment of the present application. If a true target is a plane 22, the plane reflected in a depth image measured by a depth camera 21 is a plane 23 due to the temperature change. The plane 23 deviates with respect to the plane 22, and a difference ΔZ exists between a measured depth value Z' and a true depth value Z.

In a process of modeling a measurement error, based on the foregoing analysis result of the error and Formula (3), if a deformation of the acquisition module Δl, and the temperature change are in a linear relationship, then, Δl=kΔT, where k is a temperature change coefficient. ΔT is a difference between a current temperature of the acquisition module and the temperature at the acquisition of the reference speckle image. Therefore, the deformation Δl can be measured by measuring the temperature change coefficient k and the ΔT. In a process of correcting the error, a true depth of the image can be obtained by substituting the measured change Δl into Formula (3):

$$Z = \frac{lbZ_0}{lb - Z_0 d' - Z_0 k\Delta T \tan\theta} \quad (5)$$

The temperature change coefficient k can be obtained by a temperature change experiment on the acquisition module or based on the material of the acquisition module and an empirical formula. ΔT can be obtained by a temperature sensor in the acquisition module, and the temperature sensor is used to detect the temperature of the acquisition module in real time to measure ΔT.

The foregoing correction method can be implemented using the depth computation processor. The system for correcting errors of the depth camera caused by the temperature includes a projection module, an acquisition module, a temperature sensor, a memory, and a depth computation processor. The temperature sensor is used to detect the temperature of the acquisition module in real time and transmits the temperature to the processor. In addition to store the reference speckle image, the memory is also used to store the temperature at the acquisition of the reference speckle image and a temperature change coefficient k of the acquisition module. After receiving a current speckle image transmitted by the acquisition module, the processor performs the matching computations on the current speckle image with respect to the reference speckle image to obtain a measured deviation value. The true depth value is calculated using Formula (5) with a combination of the measured deviation value, a temperature difference ΔT, and k, for correcting the error caused by the temperature. The depth computation processor can be integrated in the depth camera, or can exist in other computing devices independent of the depth camera.

A correction engine in the foregoing system for correcting the measurement error of the depth camera is located in the processor. The processor does not need to output the depth image before correcting the depth image. The method may be referred to as an internal correction method. However, in a process of the internal correction method, an additional temperature sensor apparatus is needed. As a result, the cost and volume of the depth camera are increased. In addition, the internal correction method is generally based on a specific error model theory. But in practice, the error model theory often only represents an error caused by a specific aspect, and it is difficult to comprehensively measure the error of the depth camera caused by the temperature. Therefore, the internal correction method is not provided in some depth cameras. The depth camera can directly output a depth image without error correction. The original depth image is then corrected using an additional error engine according to a specific application scenario.

Temperature Error Correction Using an External Correction Method

FIG. 4 is a schematic diagram for correcting errors of a depth camera caused by the temperature, according to another embodiment of the present application. A depth camera 31 and a depth camera 32 measure a scenario target 33 together, and respectively obtain a partial depth image 34 and a partial depth image 35 of the target 33. However, due to the error caused by the temperature, the obtained depth image 34, 35, and the true target 33 are not consistent in depth, that is, a temperature error occurs. Generally, in order to integrate the depth images 34 and 35 into a single depth image later, the field of view of the depth camera 31 and the field of view of the depth camera 32 are at least partially overlapped to create a common field of view. It can be foreseeable that the depth image obtained by fusing the depth images 34 and 35 will deviate from the true target. In addition, there may be a difference between data in the two depth images even in the common field of view. In this embodiment, the method and system for correcting errors caused by the temperature are described by an example of two depth cameras. However, the correction method and system can be applied to a case in which more than two depth cameras can work together.

As shown in FIG. 5, according to a concept that depth images obtained by different depth cameras in a common field of view should be as consistent as possible, that is, the idea of a minimum difference. The method for correcting errors of a depth camera caused by the temperature in the embodiment includes: first, obtaining, by at least two depth cameras, a depth image of a target, where two adjacent depth cameras of the at least two depth cameras have a common field of view; second, modeling a measurement error for each of the two adjacent depth cameras caused by a temperature change; and eventually, correcting the obtained depth image using the modeled measurement error, where the corrected depth image has a minimum difference in the common field of view.

The detailed description of modeling and correcting an error caused by the temperature is provided below.

Modeling of a temperature change and the causation of an error in the modeling of a temperature error can be referred to the foregoing description. In addition, modeling an error caused by the temperature may further include modeling errors between depth images of multiple depth cameras caused by a temperature change. Details are described below.

As shown in FIG. 4, the depth image 34 and the depth image 35 obtained by the depth camera 31 and the depth camera 32 both deviate from the true target 33. In the common field of view, a depth difference $\Delta Z$ between the depth image 34 and the depth image 35 can be represented as:

$$\Delta Z = Z_1 - Z_2 = Z_1 - Z + Z - Z_2 = \Delta Z_1 - \Delta Z_2 \quad (6)$$

If the depth difference is caused by the temperature change, Formula (4) can be applied to the depth cameras 31 and 32, and Formula (6) is transformed into:

$$\Delta Z = -Z_1^2 \frac{\Delta d_1}{lb} + Z_2^2 \frac{\Delta d_2}{lb} \quad (7)$$

According to $\Delta d = \Delta l \le \tan \theta$, the foregoing formula is transformed into:

$$\Delta Z = -Z_1^2 \frac{\Delta l_1 \tan \theta_1}{lb} + Z_2^2 \frac{\Delta l_2 \tan \theta_2}{lb} \quad (8)$$

$Z_1$ and $Z_2$ are true depth values of the depth cameras 31 and 32, respectively. However, considering that the true depth values are unknown, the true depth values are often substituted with the measured depth values. It is to be noted that, the foregoing formulas only describe a single point in the target. However, during an actual application, the depth value and the angle value in the formula generally are represented by a two-dimensional array.

A process of error correction using the obtained temperature change and a depth error model is essentially a process of solving $\Delta l_1$ and $\Delta l_2$ with a known $\Delta Z$ of each pixel in a known common field of view.

Figure 6:
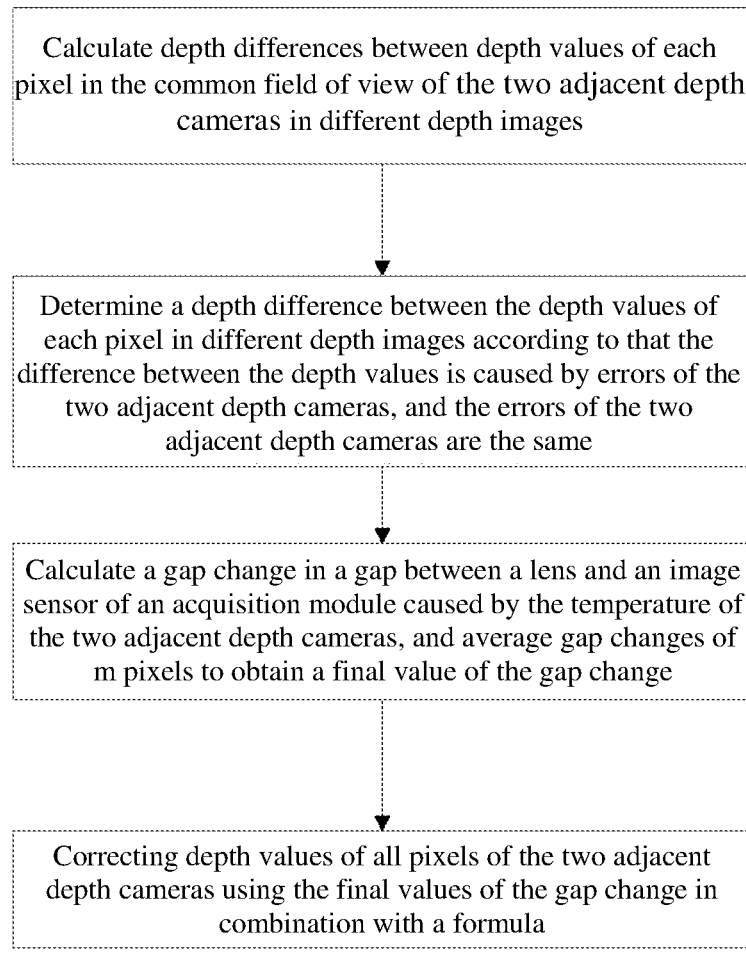
FIG. 6 is a flow chart of a method for correcting a depth image using a modeled measurement error, according to an embodiment of the present application.

As shown in FIG. 6, m pixels in a common field of view are selected, and the value of m is less than a total quantity of pixels in the common field of view. Specific steps of the error correction are as follows:

(1) calculating depth differences $\Delta Z^{(i)} = Z_1^{(i)} - Z_2^{(i)}$ between depth values of each pixel in the common field of view of the two adjacent depth cameras in different depth images, where $i \in [1, m]$;

(2) determining, by errors of the two adjacent depth cameras, the depth difference $\Delta Z^{(i)}$, wherein the errors of the two adjacent depth cameras are assumed to be the same, such that $\Delta Z_1^{(i)} = -\Delta Z_2^{(i)} = \Delta Z^{(i)}/2$;

(3) calculating gap changes $\Delta l_1^{(i)}$ and $\Delta l_2^{(i)}$ by substituting the values of $\Delta Z_1^{(i)}$ and $\Delta Z_2^{(i)}$ into Formula (4), and averaging the gap changes $\Delta l_1^{(i)}$ and $\Delta l_2^{(i)}$ corresponding to each pixel in the common field of view, to obtain the final gap changes $\Delta l_1$ and $\Delta l_2$; and (4) correcting depth values of all pixels of the two adjacent depth cameras using the final gap changes $\Delta l_1$ and $\Delta l_2$ in combination with Formula (4).

In the foregoing method, it is assumed that the errors of the common field of view are caused by the two depth cameras, and the errors are the same. In addition, the errors of pixels in the common field of view are further averaged. However, in practice, the errors of the two depth cameras are not identical, so that the precision of the foregoing correction method is low.

In some embodiments, the errors can be corrected more accurately by using a least square method. A mathematical model of the correction method is, when m pixels in the common field of view of the two depth cameras and corresponding depth values $Z_1^{(i)}$ and $Z_2^{(i)}$ are known, to solve the gap errors $\Delta l_1$ and $\Delta l_2$ caused by temperature changes of the two depth cameras, and to minimize a cost function $J = k \Sigma_{i=1}^{m} (Z_1^{(i)} - Z_2^{(i)} - \Delta Z^{(i)})^2$. $\Delta Z^{(i)}$ is determined by Formula (8), where k is a coefficient. In an embodiment, k=0.5. The solution method may include gradient descent, Newton's method, or normal equations. A detailed solution method is not described herein.

The foregoing system for correcting errors caused by the temperature using the external correction method generally includes two or more depth cameras. The correction method is generally completed by an additional correction engine, which can be an application-specific processor, or may be a software module run in a processor. The software model may be stored in a computer-readable storage medium. The correction engine may be connected to multiple depth cameras. The correction engine performs the foregoing correction method upon receiving depth data of two depth cameras and a relative position relationship between the two depth cameras.

In order to construct a mathematical model, specific errors adopted in the method described in the present application are simplified, but the corresponding errors in an actual application are more complex. The method described in the present application is applied to specific and complex scenarios. The method can be directly applied or can be applied after being appropriately accommodated based on the concept of the present application, so that the accuracy and precision of a depth camera can be improved. The appropriate accommodations based on the concept of the present application according to specific application scenarios also fall into the protection scope of the present application.

The foregoing content describes the present application in detail with reference to specific exemplary embodiments, and the specification should not be construed as a limitation to the specific implementation of the present application. Some equivalent replacements or obvious variations of the present application made by a person skilled in the art without departing from the principle of the present application, may produce the same performance or functions, and shall all fall within the protection scope of the present application.

What is claimed is:

1. A method comprising:
   obtaining, by at least two depth cameras, a depth image of a current target, wherein two adjacent depth cameras of the at least two depth cameras have a common field of view;
   modeling a measurement error of the two adjacent depth cameras caused by a temperature change, wherein the modeling comprises:
   determining a gap change $\Delta l$ caused by the temperature change in a gap l between a lens and an image sensor of an acquisition module in each of the two adjacent depth cameras; and
   determining, according to the gap change $\Delta l$, an error $\Delta d$ between a measured deviation value d' and a true deviation value d, wherein $\Delta d = \Delta l \cdot \tan \theta$ and $\theta$ is an angle between an optical axis of the lens and a connecting line between the current target and an optical center of the lens; and
   correcting the depth image using the modeled measurement error, wherein the corrected depth image has a minimum depth difference in the common field of view.

2. The method of claim 1, wherein the modeling of the measurement error further comprises:
   determining, according to the error $\Delta d$, a depth difference $\Delta Z$ between depth values in the common field of view of the two adjacent depth cameras, wherein $$\Delta Z = -Z_1^2 \frac{\Delta l_1 \tan \theta_1}{lb} + Z_2^2 \frac{\Delta l_2 \tan \theta_2}{lb},$$

wherein
$Z_1$ and $Z_2$ are respective depth values of the two adjacent depth cameras, $\Delta l_1$ and $\Delta l_2$ are respective gap changes between lenses and image sensors of acquisition modules in the two adjacent depth cameras, $\theta_1$ and $\theta_2$ are respective angles between optical axes of the lenses and connecting lines between the current target and optical centers of the lenses of the two adjacent depth cameras, and b is a length of a baseline connecting a projection module and the acquisition module of one of the two adjacent depth cameras.

3. The method of claim 2, wherein the correcting of the depth image using the modeled measurement error comprises:
   calculating depth differences $\Delta Z^{(i)} = Z_1^{(i)} - Z_2^{(i)}$ between depth values of each pixel in different depth images of the common field of view, wherein $i \in [1, m]$, m is a quantity of a portion of pixels in the common field of view, the depth difference $\Delta Z^{(i)}$ is determined by errors of the two adjacent depth cameras, and the errors of the two adjacent depth cameras are the same such that $\Delta Z_1^{(i)} = -\Delta Z_2^{(i)} = \Delta Z^{(i)}/2$;
   calculating gap changes $\Delta l_1^{(i)}$ and $\Delta l_2^{(i)}$ according to the depth difference $\Delta Z_1^{(i)}$, $\Delta Z_2^{(i)}$, and a formula $$\Delta Z_1^{(i)} = -Z^2 \frac{\Delta l \tan \theta}{lb},$$

and averaging the gap changes $\Delta l_1^{(i)}$ and $\Delta l_2^{(i)}$ corresponding to the m pixels to obtain the gap changes $\Delta l_1$ and $\Delta l_2$; and
   correcting depth values of pixels of the two adjacent depth cameras using the gap changes $\Delta l_1$ and $\Delta l_2$ in combination with the depth difference $$\Delta Z = -Z^2 \frac{\Delta l \tan \theta}{lb}.$$

4. The method of claim 2, wherein the correcting of the depth image using the modeled measurement error comprises: correcting the depth image using a least square method.

5. The method of claim 4, wherein the correcting of the depth image using the least square method comprises:
   calculating the gap changes $\Delta l_1$ and $\Delta l_2$ of the two adjacent depth cameras by minimizing a cost function $J = k \Sigma_{i=1}^{m} (Z_1^{(i)} = Z_2^{(i)} - \Delta Z^{(i)})^2$, and correcting the depth image of the at least two depth cameras according to the gap changes $\Delta l_1$ and $\Delta l_2$, wherein k is a coefficient.

6. The method of claim 5, wherein the calculating of the gap changes $\Delta l_1$ and $\Delta l_2$ comprises: calculating the gap changes $\Delta l_1$ and $\Delta l_2$ by at least one of gradient descent, Newton's method, and a normal equation.

7. A system, comprising:
   at least two depth cameras, configured to obtain a depth image of a current target, wherein two adjacent depth cameras of the at least two depth cameras have a common field of view; and
   a processor, configured to execute computer instructions stored in a memory to perform operations including:
   modeling a measurement error of the two adjacent depth cameras caused by a temperature change, wherein the modeling comprises:
   determining a gap change $\Delta l$ caused by the temperature change in a gap l between a lens and an image sensor of an acquisition module in each of the two adjacent depth cameras; and
   determining, according to the gap change $\Delta l$, an error $\Delta d$ between a measured deviation value d' and a true deviation value d, wherein $\Delta d = \Delta l \cdot \tan \theta$, and $\theta$ is an angle between an optical axis of the lens and a connecting line between the current target and an optical center of the lens; and
   correcting the depth image using the modeled measurement error, wherein the corrected depth image has a minimum depth difference in the common field of view.

8. The system of claim 7, wherein the modeling of the measurement error further comprises:
   determining, according to the error $\Delta d$, a depth difference $\Delta Z$ between depth values in the common field of view of the two adjacent depth cameras, wherein $$\Delta Z = -Z_1^2 \frac{\Delta l_1 \tan \theta_1}{lb} + Z_2^2 \frac{\Delta l_2 \tan \theta_2}{lb},$$

wherein $Z_1$ and $Z_2$ are respective depth values of the two adjacent depth cameras, $\Delta l_1$ and $\Delta l_2$ are respective gap changes between lenses and image sensors of acquisition modules in the two adjacent depth cameras, $\theta_1$ and $\theta_2$ are respective angles between optical axes of the lenses and connecting lines between the current target and optical centers of the lenses of the two adjacent depth cameras, and b is a length of a baseline connecting a projection module and an acquisition module of one of the two adjacent depth cameras.

9. The system of claim 8, wherein the correcting of the depth image using the modeled measurement error comprises:

calculating depth differences $\Delta Z^{(i)} = Z_1^{(i)} - Z_2^{(i)}$ between depth values of each pixel in different depth images of the common field of view, wherein $i \in [1, m]$, m is a quantity of a portion of pixels in the common field of view, the depth difference $\Delta Z^{(i)}$ is determined by errors of the two adjacent depth cameras, and the errors of the two adjacent depth cameras are the same such that $\Delta Z_1^{(i)} = -\Delta Z_2^{(i)} = \Delta Z^{(i)}/2$;

calculating gap changes and $\Delta l_1^{(i)}$, and $\Delta l_2^{(i)}$ according to the depth difference $\Delta Z_1^{(i)}$, $\Delta Z_2^{(i)}$, and a formula $$\Delta Z_1^{(i)} = -Z^2 \frac{\Delta l \tan \theta}{lb},$$

and averaging the gap changes $\Delta l_1^{(i)}$ and $\Delta l_2^{(i)}$ corresponding to the m pixels to obtain the gap changes $\Delta l_1$ and $\Delta l_2$; and correcting depth values of pixels of the two adjacent depth cameras using the gap changes $\Delta l_1$ and $\Delta l_2$ in combination with the depth difference $$\Delta Z = -Z^2 \frac{\Delta l \tan \theta}{lb}.$$

10. The system of claim 8, wherein the correcting of the depth image using the modeled measurement error comprises: correcting the depth image using a least square method.

11. The system of claim 10, wherein the correcting of the depth image using the least square method comprises:

calculating the gap changes $\Delta l_1$ and $\Delta l_2$ of the two adjacent depth cameras by minimizing a cost function $J = k\Sigma_{i=1}^{m}(Z_1^{(i)} - Z_2^{(i)} - \Delta Z^{(i)})^2$, and correcting the depth image of the at least two depth cameras according to the gap changes $\Delta l_1$ and $\Delta l_2$, wherein k is a coefficient.

12. The system of claim 11, wherein the calculating of the gap changes $\Delta l_1$ and $\Delta l_2$ comprises: calculating the gap changes $\Delta l_1$ and $\Delta l_2$ by at least one of gradient descent, Newton's method, and a normal equation.

13. A non-transitory computer-readable storage medium storing computer instructions executable by at least one processor to cause the at least one processor to perform operations comprising:

obtaining, by at least two depth cameras, a depth image of a current target, wherein two adjacent depth cameras of the at least two depth cameras have a common field of view;

modeling a measurement error of the two adjacent depth cameras caused by a temperature change, wherein the modeling comprises:

determining a gap change $\Delta l$ caused by the temperature change in a gap l between a lens and an image sensor of an acquisition module in each of the two adjacent depth cameras; and determining, according to the gap change $\Delta l$, an error $\Delta d$ between a measured deviation value d' and a true deviation value d, wherein $\Delta d = \Delta l \cdot \tan \theta$, and $\theta$ is an angle between an optical axis of the lens and a connecting line between the current target and an optical center of the lens; and correcting the depth image using the modeled measurement error, wherein the corrected depth image has a minimum depth difference in the common field of view.

14. The non-transitory computer-readable storage medium of claim 13, wherein the modeling of the measurement error further comprises:

determining, according to the error $\Delta d$, a depth difference $\Delta Z$ between depth values in the common field of view of the two adjacent depth cameras, wherein $$\Delta Z = -Z_1^2 \frac{\Delta l_1 \tan \theta_1}{lb} + Z_2^2 \frac{\Delta l_2 \tan \theta_2}{lb},$$

wherein $Z_1$ and $Z_2$ are respective depth values of the two adjacent depth cameras, $\Delta l_1$ and $\Delta l_2$ are respective gap changes between lenses and image sensors of acquisition modules in the two adjacent depth cameras, $\theta_1$ and $\theta_2$ are respective angles between optical axes of the lenses and connecting lines between the current target and optical centers of the lenses of the two adjacent depth cameras, and b is a length of a baseline connecting a projection module and an acquisition module of one of the two adjacent depth cameras.

15. The non-transitory computer-readable storage medium of claim 14, wherein the correcting of the depth image using the modeled measurement error comprises:

calculating depth differences $\Delta Z^{(i)} = Z_1^{(i)} - Z_2^{(i)}$ between depth values of each pixel in different depth images of the common field of view, wherein $i \in [1, m]$, m is a quantity of a portion of pixels in the common field of view, the depth difference $\Delta Z^{(i)}$ is determined by errors of the two adjacent depth cameras, and the errors of the two adjacent depth cameras are the same such that $\Delta Z_1^{(i)} = -\Delta Z_2^{(i)} = \Delta Z^{(i)}/2$;

calculating gap changes $\Delta l_1^{(i)}$ and $\Delta l_2^{(i)}$ according to the depth difference $\Delta Z_1^{(i)}$, $\Delta Z_2^{(i)}$, and a formula $$\Delta Z_1^{(i)} = -Z^2 \frac{\Delta l \tan \theta}{lb},$$

and averaging the gap changes $\Delta l_1^{(i)}$ and $\Delta l_2^{(i)}$ corresponding to the m pixels to obtain the gap changes $\Delta l_1$ and $\Delta l_2$; and correcting depth values of pixels of the two adjacent depth cameras using the gap changes $\Delta l_1$ and $\Delta l_2$ in combination with the depth difference $$\Delta Z = -Z^2 \frac{\Delta l \tan \theta}{lb}.$$

16. The non-transitory computer-readable storage medium of claim 14, wherein the correcting of the depth image using the modeled measurement error comprises:
correcting the depth image using a least square method.

17. The non-transitory computer-readable storage medium of claim 16, wherein the correcting of the depth image using the least square method comprises:
calculating the gap changes $\Delta l_1$ and $\Delta l_2$ of the two adjacent depth cameras by minimizing a cost function $J = k \Sigma_{i=1}^{m} (Z_1^{(i)} - Z_2^{(i)} - \Delta Z^{(i)})^2$, and correcting the depth image of the at least two depth cameras according to the gap changes $\Delta l_1$ and $\Delta l_2$, wherein k is a coefficient.

* * * * *